Figure 4:
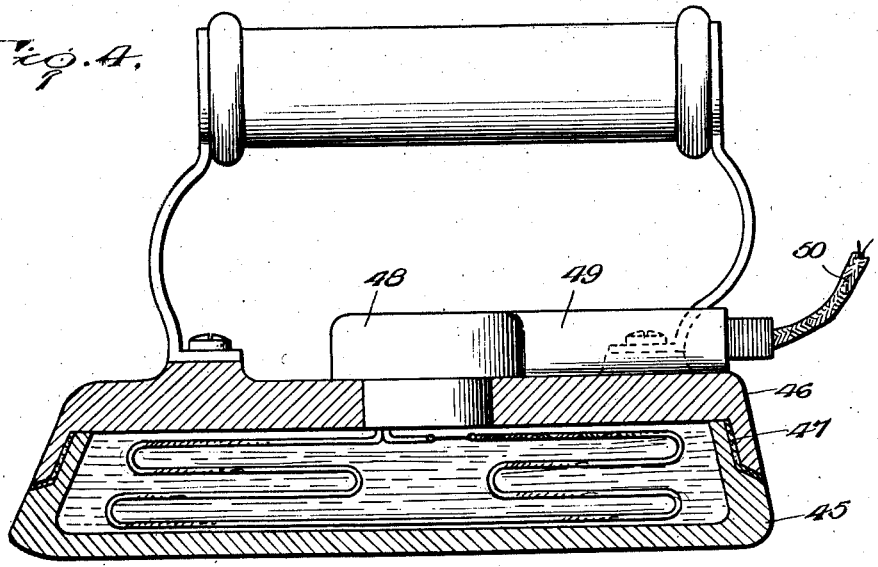

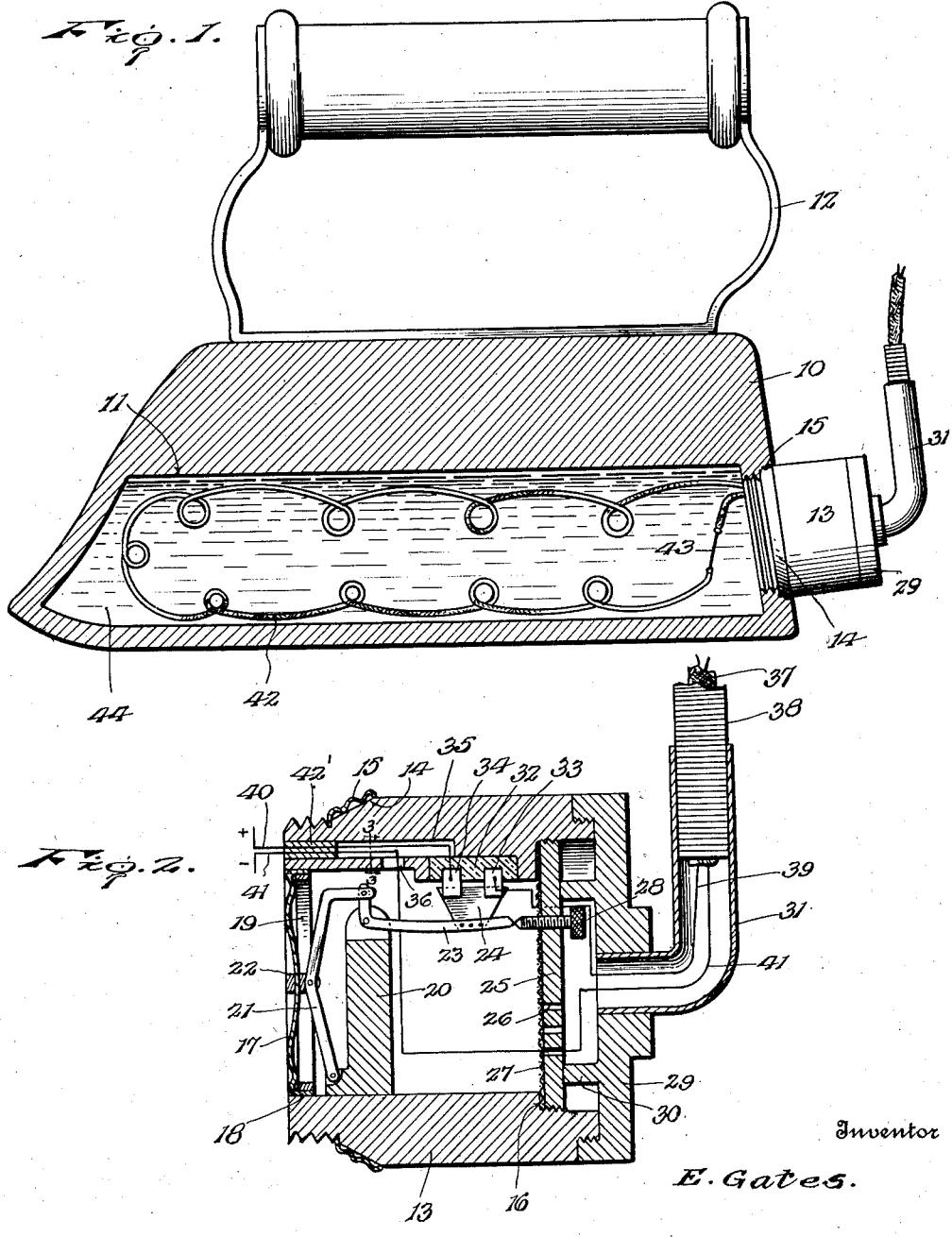

July 19, 1927.

E. GATES

FLATIRON

Filed Dec. 15, 1921

1,636,359

2 Sheets-Sheet 2

Inventor

E. Gates.

By

Lacey & Lacey, Attorneys

Patented July 19, 1927.

1,636,359

UNITED STATES PATENT OFFICE.

ELMER GATES, OF WASHINGTON, DISTRICT OF COLUMBIA; DONALD E. GATES ADMINISTRATOR OF SAID ELMER GATES, DECEASED.

FLATIRON.

Application filed December 15, 1921. Serial No. 522,552.

This invention relates to improvements in industrial heaters such as frying pans, toasters, percolaters, ovens, electric flat irons, and the like, and seeks, as one of its principal objects, to provide a heater which may be set to maintain its temperature within certain maximum and minimum limits suitable to the particular work to be done for thus not only effecting a saving in heat energy consumed but also avoiding damage by overheating or inefficiency by underheating as well as eliminating the danger of accidental fires through excessive temperature.

A further object of the invention is to provide a heater wherein the waste of heat by dissipation will be reduced to a minimum and wherein oxidation of the heating element with a consequent increase in resistivity will be overcome, thus making it possible to employ different resistances not now practicable.

The invention has as a still further object to provide a heater wherein a uniform distribution of heat from the heating element will be had.

A still further object is to provide a heater wherein the temperature of the heating element will be controlled by the insulating medium for said element and wherein said medium will be in direct contact with the working surface of the heater for transferring the heat generated thereto.

The invention has as a further object to provide a heater wherein the insulating medium will be of high heat conductivity so that the heating element need be maintained at but a slightly higher temperature than the working surface of the heater in order to heat said surface to the desired degree and wherein, due to the conductivity of said medium, scorching by latent heat will be prevented by reason of the ability of said medium to cool quickly when the heating element is deenergized below the scorching point of the working surface.

And the invention has a still further object to provide a heater which will, in effect, embody a thermostat comprising an expansible medium for insulating the heating element, wherein the heat will be generated by the element directly in said medium so that practically all of the heat so generated will be utilized, wherein said medium will serve to transfer the heat direct to the working surface of the heater, and wherein the expansion and contraction of said medium in volume will serve to regulate the temperature of the heating element.

Other and incidental objects will appear hereinafter.

Figure 5:
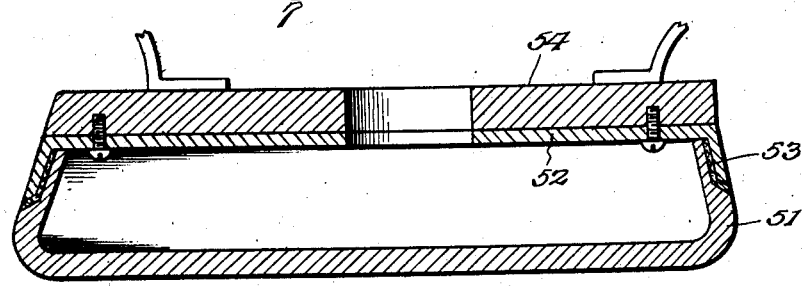
Figure 3:
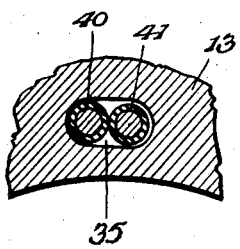

In the drawings:

Figure 1 is a vertical sectional view showing the present invention embodied in an electric flat iron, Figure 2 is an enlarged sectional view of the control switch employed, Figure 3 is a fragmentary sectional view on the line 3—3 of Figure 2, looking in the direction of the arrows, Figure 4 is a vertical sectional view showing a slightly modified form of iron, and Figure 5 is a vertical sectional view showing a still further modified form of iron.

Referring now more particularly to the drawings, I have, as previously stated, shown the present invention embodied in a flat iron. The body of the iron is indicated at 10 and formed therein near the bottom of the iron is a heating chamber 11 conforming in transverse configuration to the shape of the bottom working face of the iron, it being observed that only a small thickness lies between the chamber and said face. On the other hand, above the chamber a disproportionate thickness of metal is present in order to provide the necessary weight for the iron, and appropriately secured to the upper face of the body is a suitable handle 12. Threaded through the wall of the chamber 11 is a switch plug 13 provided near its inner end with a beveled face 14 to confront a similar beveled face upon said wall and interposed between these faces is a circularly corrugated gasket 15 which may be formed of lead. This construction provides an arrangement whereby the plug will hermetically seal the chamber. However, the plug may be otherwise connected to the body of the iron, if desired. As shown in Figure 2, the plug is tubular and is counterbored at its outer end to provide an internal annular shoulder 16. Fitting in the inner end of the plug is a diaphragm 17 having a peripheral flange 18 and fitting in this flange is a locking ring 19, the ring and flange being brazed or otherwise secured to the inner wall of the plug for not only firmly securing the diaphragm in position but also providing a closed joint between the diaphragm and the plug. Upstanding within the plug in the rear of the diaphragm is a post 20 and pivoted at one end upon the base of said post is a lever 21. Extending from the diaphragm axially thereof is a center stud 22 pivotally connected at its rear end with the intermediate portion of the lever and mounted to rock upon the post at its upper end is a bell crank 23, the short arm of which is pivotally connected to the upper end of the lever. Near its rear end, this bell crank carries an upstanding switch blade 24. Threaded into the counterbore at the rear end of the plug is a disc 25 provided with a plurality of air passages 26 therethrough and overlying the inner face of the disc is a fine mesh wire screen 27 clamped between the disc and the shoulder 16. The bell crank 23 is pointed at its rear end and threaded through the disc is a regulating screw 28 having a pointed inner end to coact with the pointed end of the bell crank. Threaded upon the plug at its rear or outer end is a closure cap 29 provided at its inner side with an annular flange 30 abutting the disc 25 for rigidly bracing said disc and leading through the cap axially thereof is an elbow 31. Embedded in the inner face of the wall of the plug at its upper side is a block 32 of suitable insulating material and mounted upon this block are switch poles 33 and 34 disposed to coact with the switch blade 24. Leading forwardly through the wall of the plug from said block is a channel 35 preferably of the cross sectional configuration shown in Figure 3, and entering this channel near its inner end is an opening 36. A feed cable 37 is appropriately secured at its inner end in the upper end of the elbow 31, a protecting coil 38 being employed for the cable, if desired. One wire 39 of this cable is led through the elbow and through the disc 25 and is connected to the switch pole 33. Leading from the switch pole 34 through the channel 35 is a circuit wire 40. The other wire 41 of the cable is directed through one of the passages 26 in the disc and thence through the opening 36 into the channel 35 and surrounding the wires 40 and 41 in said channel is a closure plug 42 for the channel. This plug may be of any appropriate material and hermetically seals the channel at its inner end. Connected at its ends to the wires 40 and 41 is a heating element 42 of suitable resistance wire. This heating element is disposed within the chamber 11 of the body of the iron and is protected by some suitable porous insulating covering so that should portions of the wire come in contact with each other, short circuiting will not result. Interposed in the length of the wire is a fuse 43 and submerging the wire is a fluid heating medium 44 filling the chamber 11 to a level near the top thereof. The heating medium 44 is preferably formed by a quantity of linseed oil and constitutes a liquid insulator for the heating element 42. In assembling the iron, the oil is first heated to an appropriate temperature and is then introduced into the chamber 11 when the chamber is closed by the plug 13, the heating element 42 being, of course, inserted in the chamber when the plug is applied. Accordingly, when the oil cools, a vacuum will be established by the oil for accommodating subsequent expansion of the oil under working conditions of the iron.

As will now be seen, the heating medium 44 will be in direct contact with the inner face of the working surface of the iron practically throughout the entire area of said surface while the heating element 42 will generate heat directly in said medium. Consequently, the distribution of heat to the working surface of the iron will be uniform while a minimum of heat will be wasted. Furthermore, since the heating medium will be of high heat conductivity, the heat generated therein will be transferred with rapidity to the working surface of the iron so that the heating element 42 need be maintained but slightly hotter than the desired temperature of said surface while, due to the rapid transfer of heat through the heating medium, sufficient latent heat will not remain after the current to the heating element has been cut off to cause scorching at the working surface of the iron. Since the heating element is completely submerged, oxidation, with its consequent progressive resistivity, will be largely overcome. Accordingly, different resistance wires not now practicable, may be employed in the present instance and since practically all the heat generated is utilized, I find it possible to employ an increased length of resistance wire with correspondingly lower temperatures of the wire. This feature tends to prevent the resistance wire from becoming burnt out but I, nevertheless, preferably employ the fuse 43 as an additional factor of safety and while I am aware that a relatively long wire at a correspondingly reduced temperature may not be as efficient in producing heat for the current consumed as a shorter wire at a higher temperature, still, no disadvantage is suffered by reason of the fact that I utilize practically all of the heat generated and accordingly find incandescence of the resistance wire unnecessary.

When the switch plate 24 is engaged with the switch poles 33 and 34 and the switch is closed, current will, as will be at once appreciated, flow through the heating element 42 for energizing said element and heating the heating medium 44. As the temperature of the heating medium is raised, said heating medium will expand against the diaphragm 17 for rocking the lever 21 in a direction tending to swing the bell crank 23 downwardly. As the tension against the diaphragm is increased the bell crank will be flexed to snap over the inner end of the regulating screw 28 and consequently swing the switch blade to open position for cutting off flow of current through the heating element. The iron will then be permitted to cool and as the heating medium 44 contracts to relieve its pressure against the inner side of the diaphragm 17, the diaphragm will be returned to normal position by atmospheric pressure within the plug 13, air entering through the elbow 31 and passages 26 in the disc 25. Consequently, the lever 21 will be rocked in a direction tending to swing the bell crank 23 upwardly and, as the effective atmospheric pressure against the diaphragm increases, the bell crank will be caused to snap over the inner end of the regulating screw 28 for returning the switch blade 24 to closed position cooperating with the switch poles. The circuit through the heating element will accordingly be again closed. Thus, the temperature of the iron will be automatically maintained within certain maximum and minimum limits so that overheating, with consequent danger and waste of current, will be avoided, while, at the same time, inefficiency due to underheating will also be overcome. As will be seen, the regulating screw 28 may be set for varying the maximum and minimum temperatures of the iron to suit the work to be done and, if desired, an appropriate pointer and dial, not shown, may be associated with the screw whereby any desired temperature range may be easily selected. The screen 27 is provided as a safety device for preventing ignition of any gases about the place of use of the iron by a spark thrown off from the switch when being opened or closed.

Attention is now directed to the fact that the heating medium 44 constitutes the expansible element of a thermostat and that expansion and contraction of said medium in volume serves to control the energization of the heating element. Furthermore, it will be seen that the heating medium may be said to perform, in effect, the actual thermic work of the iron, being separated from the bottom smoothing surface of the iron only by a thin layer of metal. Accordingly, the heating medium will be directly subjected to temperature changes set up by the performance of the work of the iron and will, therefore, respond accurately, by expansion and contraction in volume, to said changes. I thus provide an arrangement wherein the expansible element of a thermostat is constituted in a heating medium itself directly heated and disposed to directly perform in a practical sense, the thermic work of the iron so as to thus be directly subjected to temperature changes incident to the work and consequently intimately reflect said changes to regulate the heating of said medium. The temperature of the working surface of the iron will thus be maintained relatively constant.

In Figure 4 of the drawings, I have illustrated a slight modification of the invention wherein the body of the iron is formed with a bottom section 45 and a mating top section 46 fitting over the bottom section. At the joint between the sections, said sections are preferably formed with beveled faces and interposed between the sections is an appropriate gasket 47. The top section is provided centrally with an opening and secured in said opening is a switch plug 48 similar to the plug 13 of the embodiment of the invention previously described with the exception that the plug 48 is provided with a lateral tube 49 extending rearwardly along the top of the iron to receive the feed cable 50. Otherwise, this modification is identical with the preferred construction.

In Figure 5 of the drawings, I have illustrated a still further modification of the invention wherein the body of the iron is pressed and is formed with a section 51 and a mating top section 52 similar to the sections 45 and 46 of the prior modification. At the junction between the sections a beveled joint is provided and interposed between the sections is a gasket 53. In order to provide the necessary weight for the iron, a block of metal 54 is appropriately secured to the top section and formed through this block as well as through said section is an opening to accommodate a switch plug as in the modification previously described.

Having thus described the invention, what is claimed as new is:

In a heater, the combination of a body provided with a heating chamber having a thin wall provided with a smoothing face and an opposite thick wall forming a weight for pressing said face against the work, a resistance in said chamber, and a heating medium in said chamber immersing said resistance and directly in contact therewith.

In testimony whereof I affix my signature.

ELMER GATES. [L. S.]